US011072222B2

(12) United States Patent
Humburg et al.

(10) Patent No.: US 11,072,222 B2
(45) Date of Patent: Jul. 27, 2021

(54) COMBUSTION CHAMBER ASSEMBLY UNIT

(71) Applicant: Eberspächer Climate Control Systems GmbH & Co. KG, Esslingen (DE)

(72) Inventors: Michael Humburg, Göppingen (DE); Wolfgang Pfister, Esslingen (DE); Walter Blaschke, Deizisau (DE)

(73) Assignee: Eberspächer Climate Control Systems GmbH, Esslingen am Neckar (DE)

( * ) Notice: Subject to any disclaimer, the term of this patent is extended or adjusted under 35 U.S.C. 154(b) by 175 days.

(21) Appl. No.: 16/539,563

(22) Filed: Aug. 13, 2019

(65) Prior Publication Data

US 2020/0055373 A1 Feb. 20, 2020

(30) Foreign Application Priority Data

Aug. 14, 2018 (DE) ...................... 10 2018 119 701.2
Oct. 31, 2018 (DE) ...................... 10 2018 127 168.9

(51) Int. Cl.
*B60H 1/00* (2006.01)
*B60H 1/04* (2006.01)
*F02F 1/10* (2006.01)
*F02F 1/24* (2006.01)

(52) U.S. Cl.
CPC ................ *B60H 1/04* (2013.01); *F02F 1/10* (2013.01); *F02F 1/24* (2013.01)

(58) Field of Classification Search
CPC ... F23D 2900/21002; B60H 2001/2271; F23N 2241/14
USPC ..................................................... 237/12.3 B
See application file for complete search history.

(56) References Cited

U.S. PATENT DOCUMENTS

| | | | | |
|---|---|---|---|---|
| 4,519,769 A * | 5/1985 | Tanaka | ...................... | F23C 3/00 431/4 |
| 4,718,602 A * | 1/1988 | Beck | ......................... | F23Q 3/00 237/32 |
| 4,923,033 A * | 5/1990 | Panick | .................. | B60H 1/2212 126/116 R |
| 4,976,463 A * | 12/1990 | Soo | ....................... | B60H 1/2209 237/12.3 B |
| 5,423,674 A * | 6/1995 | Knopfel | ................... | F23C 7/002 431/115 |
| 2015/0102116 A1* | 4/2015 | Pfister | ................... | F23D 11/448 237/12.3 C |

(Continued)

FOREIGN PATENT DOCUMENTS

CN 101349425 A 1/2009
DE 10 2016 015 762 A1 3/2018
(Continued)

*Primary Examiner* — Long T Tran
*Assistant Examiner* — James J Kim
(74) *Attorney, Agent, or Firm* — McGlew and Tuttle, P.C.

(57) ABSTRACT

A combustion chamber assembly unit for a fuel-operated vehicle heater includes a combustion chamber housing (14) elongated in a direction of a housing longitudinal axis (L), with a combustion chamber (16) radially outwardly bounded by a circumferential wall (18), and with a combustion chamber bottom (20) axially delimiting the combustion chamber (16). A combustion air feed volume (36) is provided that is open to the combustion chamber (16) via a plurality of passage openings (38). A cooling medium feed device (46) is provided for feeding a liquid cooling medium to the combustion air feed volume (36).

20 Claims, 5 Drawing Sheets

(56) References Cited

U.S. PATENT DOCUMENTS

2018/0066841 A1* 3/2018 Blaschke .................. F23D 3/40
2018/0072134 A1* 3/2018 Humburg .................. F23C 9/08

FOREIGN PATENT DOCUMENTS

| DE | 102016116687 A1 | 3/2018 |
| DE | 102017100430 A1 | 7/2018 |
| DE | 10 2018 127 168 B3 | 10/2019 |
| JP | 2011190783 A | 9/2011 |
| JP | 2014145563 A | 8/2014 |

* cited by examiner

COMBUSTION CHAMBER ASSEMBLY UNIT

CROSS REFERENCE TO RELATED APPLICATIONS

This application claims the benefit of priority under 35 U.S.C. § 119 of German Applications 10 2018 119 701.2, filed Aug. 14, 2018 and 10 2018 127 168.9, filed Oct. 31, 2018, the entire contents of which are incorporated herein by reference.

TECHNICAL FIELD

The present invention pertains to a combustion chamber assembly unit for a fuel-operated vehicle heater.

TECHNICAL BACKGROUND

Such vehicle heaters, which are operated with fuel, for example, with diesel fuel or gasoline, i.e., especially liquid fuel, for example, as parking heaters or as auxiliary heaters, are used to heat the air to be introduced into the interior of a vehicle or to the liquid coolant circulating in a coolant circuit of an internal combustion engine. Since only little space is available, in general, for the installation of such vehicle heaters, these must have a compact configuration, but they nevertheless must be able to make available the necessary heat output. To achieve this at a sufficiently high efficiency, such vehicle heaters are operated with very high combustion temperatures, which, even though guaranteeing the provision of a large amount of thermal energy, on the one hand, does lead to a high nitrogen oxide emission, on the other hand.

SUMMARY

An object of the present invention is to provide a combustion chamber assembly unit for a fuel-operated vehicle heater, which vehicle heater reaches a high heat output with reduced nitrogen oxide emission while having a compact configuration.

This object is accomplished according to the present invention by a combustion chamber assembly unit for a fuel-operated vehicle heater, comprising a combustion chamber housing elongated in the direction of a housing longitudinal axis with a combustion chamber circumferential wall defining a combustion chamber radially outwards and with a combustion chamber bottom axially defining the combustion chamber, as well as a combustion air feed volume open to the combustion chamber via a plurality of passage openings, further comprising a cooling medium feed device for feeding liquid cooling medium to the combustion air feed volume.

By introducing a liquid cooling medium, for example, water, into the combustion air sent to the combustion chamber, a lowering of the combustion temperature is achieved in the area of the combustion chamber or of a volume area, which adjoins it and is formed, for example, in a flame tube, based on the high evaporation enthalpy provided by the liquid cooling medium. The lowering of the combustion temperature leads to a reduced percentage of nitrogen oxides in the waste gas, but it would basically reduce the efficiency of the vehicle heater, because the waste gas caused to interact thermally with a medium to be heated in a heat exchanger unit has a correspondingly lower temperature. However, since the waste gas leaving the combustion chamber or a flame tube transports the cooling medium vapor in the combustion chamber assembly unit configured according to the present invention and such a hot vapor has a markedly higher heat transfer coefficient than dry flue gas, the waste gas transporting the cooling medium vapor can transfer substantially more heat to a medium to be heated in the heat exchanger unit, as a result of which the lowering of the combustion temperature, brought about by the introduction of the liquid cooling medium, is compensated.

To make it possible to introduce the liquid cooling medium close to the combustion chamber, it is proposed that an outer circumferential wall surrounding the combustion chamber circumferential wall on the outside be provided, a combustion air feed chamber of the combustion air feed volume being formed between the combustion chamber circumferential wall and the outer circumferential wall, and the combustion air feed chamber being open to the combustion chamber at least over some of the passage openings, and it is proposed that the cooling medium feed device comprise at least one cooling medium feed line for releasing liquid cooling medium into the combustion air feed chamber. Provisions may be made in this connection, in particular, for the cooling medium feed line to open into the combustion air feed chamber.

The cooling medium feed line may have at least one cooling medium release opening open to the combustion air feed chamber.

It is proposed for the distribution of the liquid cooling medium to be introduced that a cooling medium release nozzle with at least one cooling medium release opening and preferably with a plurality of cooling medium release openings be provided at one end of a line section of the cooling medium feed line, which said line section extends into the combustion air feed chamber.

The line section may extend in this case essentially in the direction of the housing longitudinal axis.

In an alternative type of configuration, provisions may be made for a uniform introduction of the cooling medium into the combustion chamber for the combustion air feed chamber to surround the combustion chamber radially on the outside in at least some areas and for the cooling medium feed line to have a line section extending around the combustion chamber circumferential wall in at least some areas in the circumferential direction in the combustion air feed chamber, wherein at least one cooling medium release opening and preferably a plurality of cooling medium release openings is/are provided in the line section.

The uniform introduction of the cooling medium may be supported by a plurality of cooling medium release openings being provided, and by the cooling medium release openings being arranged following one another in the circumferential direction along the line section.

At least one cooling medium release opening and preferably each cooling medium release opening may be provided on a side of the line section that axially faces the combustion chamber bottom. The cooling medium released from the cooling medium feed line is released now into the combustion air essentially against the flow direction of the combustion air flowing around this line, so that a distribution of the liquid cooling medium in the combustion air already takes place during this process. As an alternative or in addition, provisions may be made for at least one cooling medium release opening and preferably for each cooling medium release opening to be provided on a side of the line section that faces axially away from the combustion chamber bottom. The cooling medium released from cooling medium release openings oriented in this manner is efficiently carried by the combustion air flowing around the cooling medium feed line and is guided in the direction of the combustion chamber.

For feeding the cooling medium, the cooling medium feed device may comprise a cooling medium pump for delivering the liquid cooling medium from a cooling medium reservoir to the combustion air feed volume.

In case the combustion chamber assembly unit is configured as a so-called vaporizing burner, the combustion chamber bottom may comprise porous evaporator medium and a fuel feed line guiding liquid fuel to the porous evaporator medium.

The present invention further pertains to a vehicle heater, comprising a combustion chamber assembly unit configured according to the present invention.

A further reduction of the nitrogen oxide emission can be achieved in an advantageous variant by a reduction catalytic converter device, for example, an SCR catalytic converter device, around which waste gas can flow, being provided in an exhaust gas flow volume, and by the cooling medium feed device being configured for feeding a reducing agent as a liquid cooling medium. Thus, not only the effect of a flame temperature lowered by the evaporation of the reducing agent, but also the selective catalytic reduction taking place in the SCR catalytic converter device with the use of this evaporated reducing agent, which is transported in the waste gas stream, are utilized to bring about a substantial reduction of the percentage of nitrogen oxides in the waste gas.

To utilize now the space available for installation in a vehicle heater, it is proposed that a waste gas flow space providing at least a part of the exhaust gas flow volume be formed between the combustion chamber assembly unit and a heat exchanger housing and that the reduction catalytic converter device be arranged in the exhaust gas flow space.

Further, an oxidation catalytic converter device may be provided in the waste gas flow volume for the treatment of the waste gas.

It is proposed for a compact design having a simple configuration that the reduction catalytic converter device be integrated into the oxidation catalytic converter device. This can be achieved, for example, by the catalytic material of the reduction catalytic converter device being applied to surface areas of a substrate of the oxidation catalytic converter device.

The present invention will be described below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
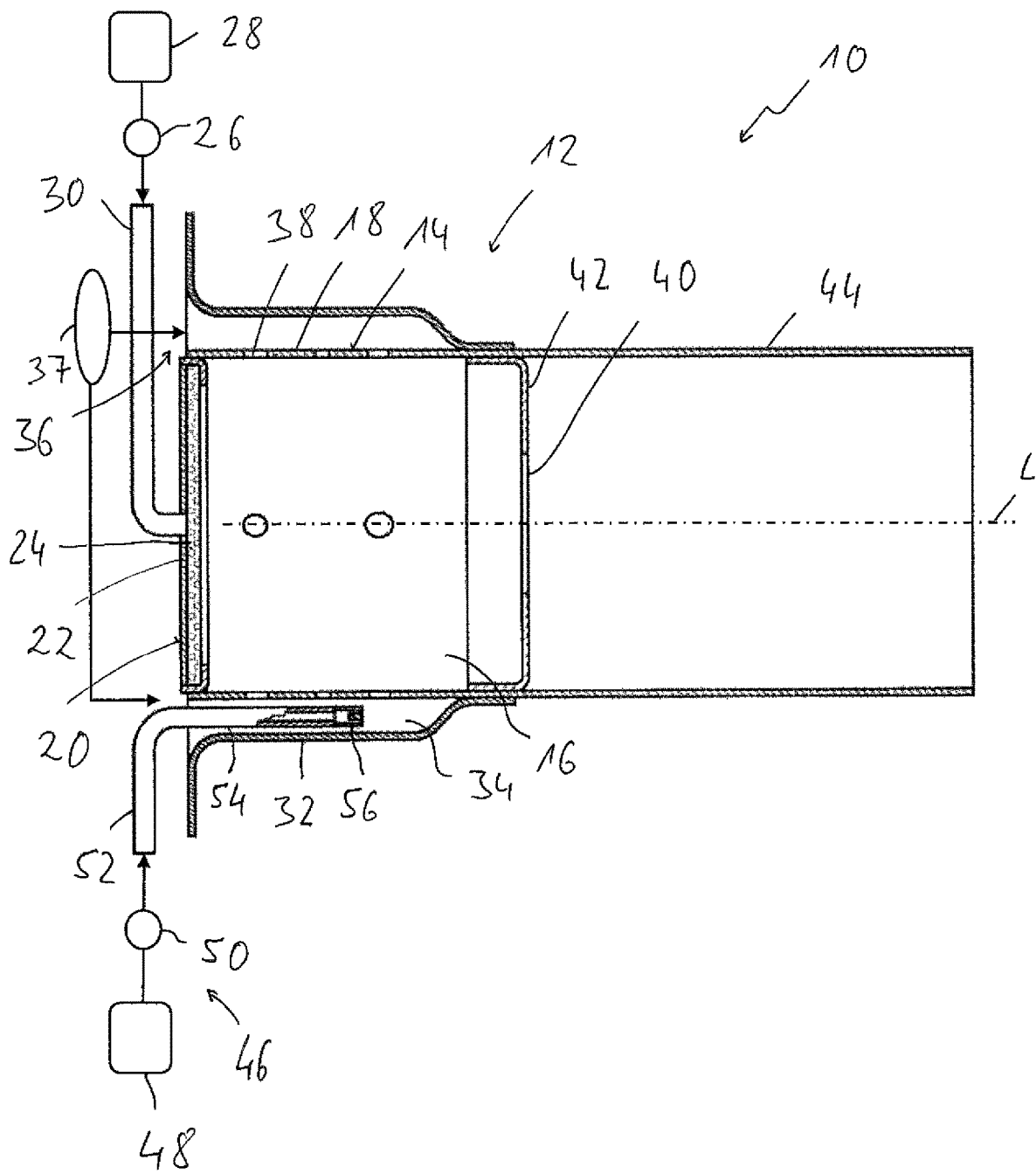
FIG. 1 is a longitudinal sectional view of a combustion chamber assembly unit for a fuel-operated vehicle heater.

Referring to the drawings, A combustion chamber assembly unit for a fuel-operated vehicle heater 10 is generally designated by 12 in FIG. 1. The combustion chamber assembly unit 12 comprises a combustion chamber housing 14, which is elongated in the direction of a housing longitudinal axis L and has a combustion chamber circumferential wall 18 defining a combustion chamber 16 radially outwards. A combustion chamber bottom 20 is fixed at the combustion chamber circumferential wall 18. This bottom 20 defines the combustion chamber 16 axially and comprises a porous evaporator medium 24, e.g., a metal mesh, foam ceramic or the like, at a carrier device 22.

A fuel pump 26, for example, a feed pump, delivers liquid fuel from a fuel reservoir 28 via a fuel feed line 30 into the porous evaporator medium 24. The fuel fed in the liquid state is distributed in the porous evaporator medium 24 by capillary delivery action and is released as fuel vapor at a surface facing the combustion chamber 16 in the direction of the combustion chamber.

An outer circumferential wall 32 surrounding the combustion chamber circumferential wall 18 radially on the outside, i.e., on the outer side thereof, is fixed to the combustion chamber housing 14, for example, by welding, and it defines, together with the combustion chamber circumferential wall 18, a combustion air feed chamber 34 of a combustion air feed volume, generally designated by 36, which combustion air feed chamber surrounds this combustion chamber circumferential wall preferably in the entire circumferential area thereof in a ring-like manner. A combustion air blower 37, for example, a side channel blower, delivers combustion air into the combustion air feed volume 36 and thus into the combustion air feed chamber 34 surrounding the combustion chamber circumferential wall 18. A plurality of passage openings 38, through which the combustion air having a substantial flow direction component along the housing longitudinal axis L can flow into the combustion chamber 16 radially inwards and be mixed with the fuel vapor there in order to provide an ignitable and combustible mixture. This mixture can be ignited by an igniting element, not shown in FIG. 1, in order to start the combustion in the combustion chamber assembly unit 12 in this manner. The waste gas, which is formed during this combustion in the combustion chamber and leaves the combustion chamber, passes through an opening 40 in a flame diaphragm 42 into a flame tube 44, which adjoins the combustion chamber circumferential wall 18, and is configured integrally therewith in the exemplary embodiment shown. The waste gas leaving the flame tube 44 can transfer heat to a medium to be heated, for example, to the air to be introduced into the interior space of a vehicle, or to the liquid coolant circulating in a coolant circuit of an internal combustion engine of a vehicle, before it is discharged into the environment.

Figure 2:
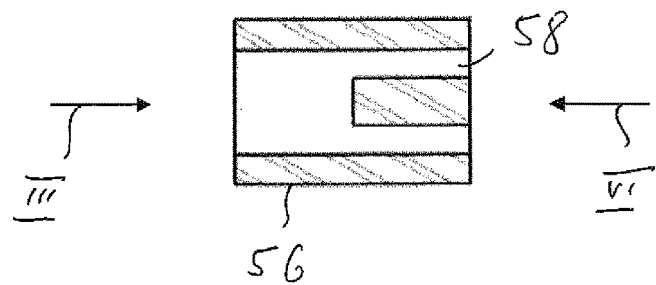
FIG. 2 is a longitudinal sectional view of a cooling medium release nozzle.
Figure 3:
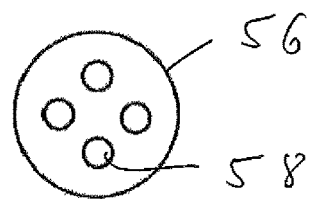
FIG. 3 is the cooling medium release nozzle according to FIG. 2 in viewing direction III in FIG. 2.
Figure 4:
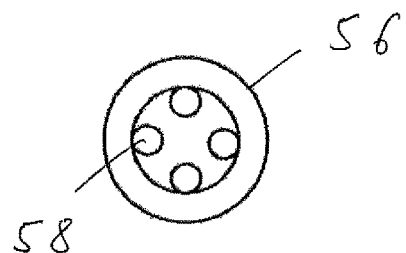
FIG. 4 is the cooling medium release nozzle according to FIG. 2 in viewing direction IV in FIG. 2.
Figure 5:
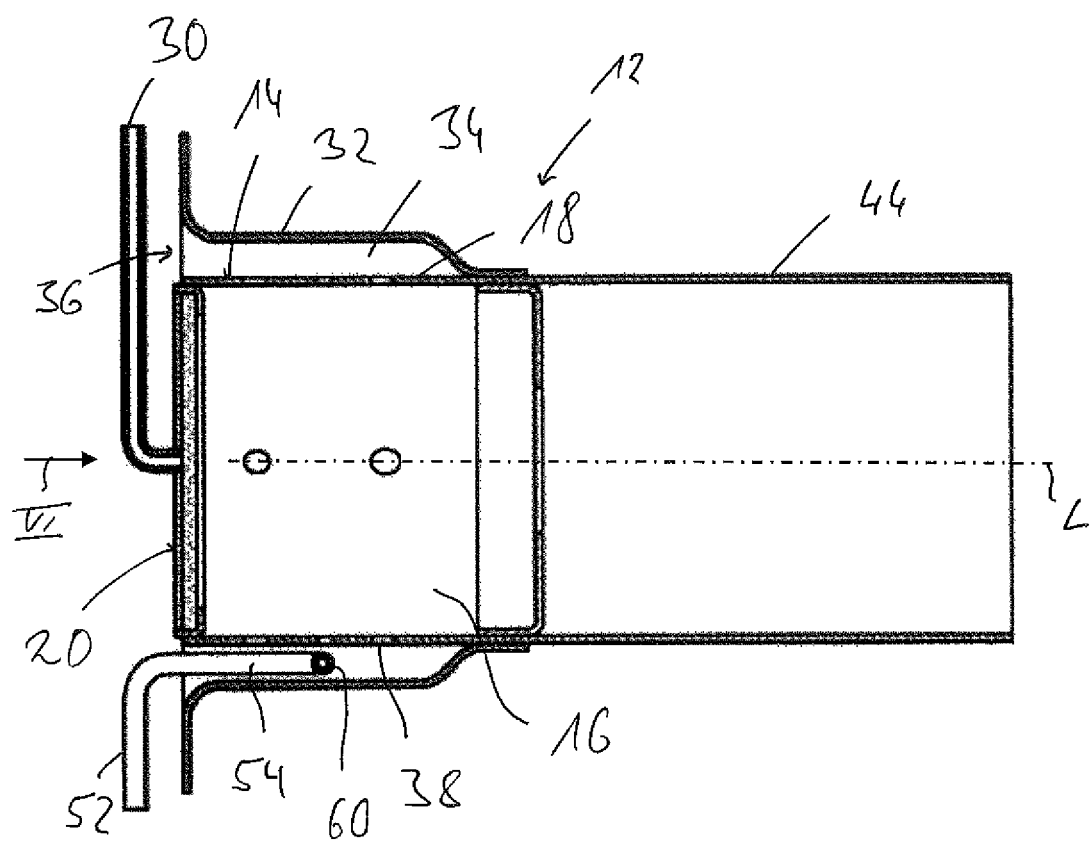
FIG. 5 is a view corresponding to FIG. 1 of an alternative embodiment of a combustion chamber assembly unit.

A cooling medium feed device, generally designated by 46, via which a liquid cooling medium, e.g., demineralized or distilled water, can be fed into the combustion air feed volume 36, especially the combustion air feed chamber 34, as soon as the combustion in the combustion chamber 16 has stabilized after the beginning of the combustion operation, is provided in the combustion chamber assembly unit 12 shown in FIG. 1. The cooling medium feed device 46 comprises a cooling medium pump 50 delivering the liquid cooling medium from a cooling medium reservoir 48. This pump 50 delivers the cooling medium into a cooling medium feed line 52. A line section 54 of the cooling medium feed line 52, which section extends approximately in the direction of the housing longitudinal axis L into the combustion air feed chamber 34, has a cooling medium release nozzle generally designated by 56 at its end. This cooling medium release nozzle 56, shown in more detail in FIGS. 2 through 4, has a plurality of cooling medium release openings 58, through which the liquid coolant flowing in the cooling medium feed line 52 is released and is thus introduced into the combustion air flowing in the combustion air feed chamber 34.

The liquid coolant, introduced at first in the liquid form into the combustion air, is evaporated partially already before the combustion air flows into the combustion chamber 16, i.e., in the combustion air feed chamber 34, and partly after introduction into the combustion chamber 16. Since the outer circumferential wall 32 is also heated by the combustion process taking place in the combustion chamber 16, the combustion air is preheated already before the combustion air is introduced into the combustion chamber 16, so that the evaporation of the liquid cooling medium is supported already in the area of the combustion air feed chamber. The energy necessary for this is removed from the combustion process taking place in the combustion chamber 16, so that the combustion temperature is lowered and the waste gas, which leaves the combustion chamber 16 or the flame tube 44 with a lower temperature but which transports the cooling medium vapor, will correspondingly flow in the direction of the heat exchanger unit.

Since the cooling medium vapor being transported in the waste gas has a substantially higher heat transfer coefficient than dry waste gas, i.e., waste gas not transporting cooling medium vapor, a substantially more efficient transfer of heat to the medium to be heated is achieved in the heat exchanger unit following downstream despite the lowered waste gas temperature. It is thus made possible to provide higher heat outputs based on the high efficiency while the percentage of nitrogen oxides in the waste gas is also lowered due to the lower combustion temperature.

It should be noted that the cooling medium feed line 52 may, of course, extend, especially with its line section 54 opening into the combustion air feed chamber 34, in a different direction in the embodiment shown in FIG. 1. Thus, this feed line 52 may have, for example, a circumferential direction extension component that extends in the circumferential direction and thus ends in a suitable position with the cooling medium release nozzle 56. The line section 54 may also have one or more cooling medium release openings in the area located in front of (upstream of) the cooling medium release nozzle 56.

An alternative embodiment is shown in FIGS. 5 through 8. This corresponds, in terms of the general configuration of the combustion chamber assembly unit, to the above-described configuration, so that reference can be made to these explanations.

There is a difference in the embodiment of the cooling medium feed line 52. This feed line 52 is configured in the embodiment shown in FIGS. 5 through 8 such that a line section 60, extending in the combustion air feed chamber 34 around the combustion chamber circumferential wall 18 in the circumferential direction, adjoins the line section 54 extending, for example, in the direction of the housing longitudinal axis L. Cooling medium release openings 62 are provided following one another in the circumferential direction about the housing longitudinal axis L in this line section 60. A better distribution of the liquid cooling medium introduced into the combustion air over the circumference of the combustion air feed chamber is achieved and a more uniform introduction of the cooling medium into the combustion chamber is thus also guaranteed in this manner.

Figure 6:
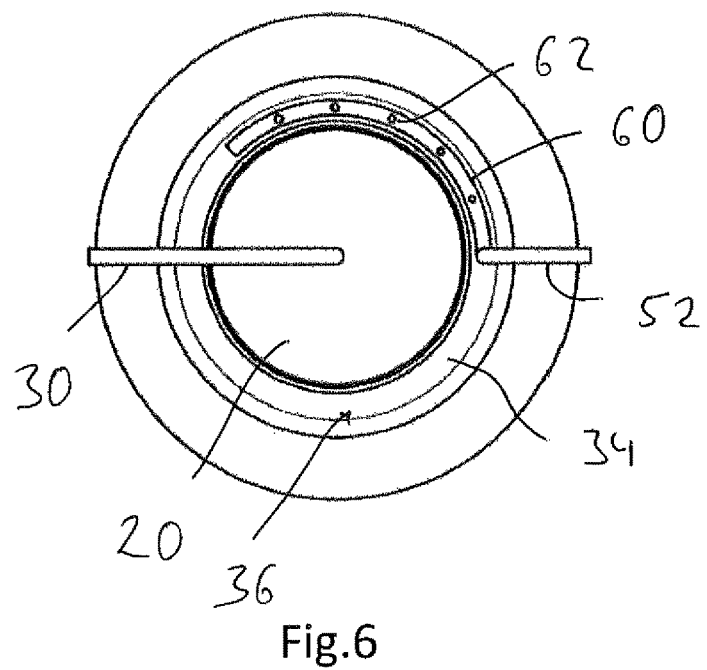
FIG. 6 is the combustion chamber assembly unit according to FIG. 5 in viewing direction VI in FIG. 5.
Figure 7:
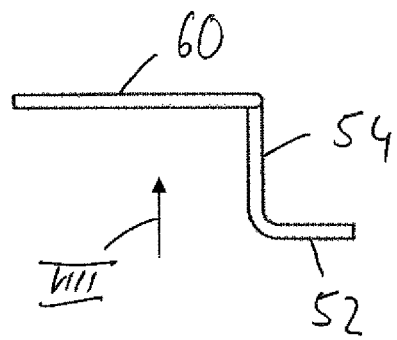
FIG. 7 is a cooling medium feed line of the combustion chamber assembly unit according to FIG. 5.
Figure 8:
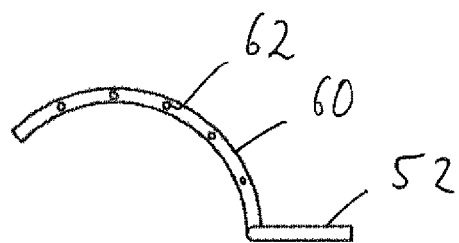
FIG. 8 is the cooling medium feed line according to FIG. 7 in viewing direction VIII in FIG. 7.

It is seen especially in FIGS. 6 and 8 that the cooling medium release openings 62, or some of the cooling medium release openings 62, are provided at the line section 60 of the cooling medium feed line 52 on the side of the line section 60 that axially faces toward the combustion chamber bottom 20. This means that cooling medium is released from these cooling medium release openings 62 in a direction that is directed essentially opposite the flow direction of the combustion air in the combustion air feed chamber 34. An efficient mixing with the combustion air flowing around the line section 60 is guaranteed in this manner already when the cooling medium is discharged from the line section 60. As an alternative or in addition, such cooling medium release openings may also be provided on the side of the line section 60 facing away from the combustion chamber bottom 20.

It should be noted that the line section 60 may, of course, also extend over a larger circumferential area of the combustion air feed chamber 34. The line section 60 may also have an extension direction component in the direction of the housing longitudinal axis, so that the line section 60 is wound helically.

Figure 9:
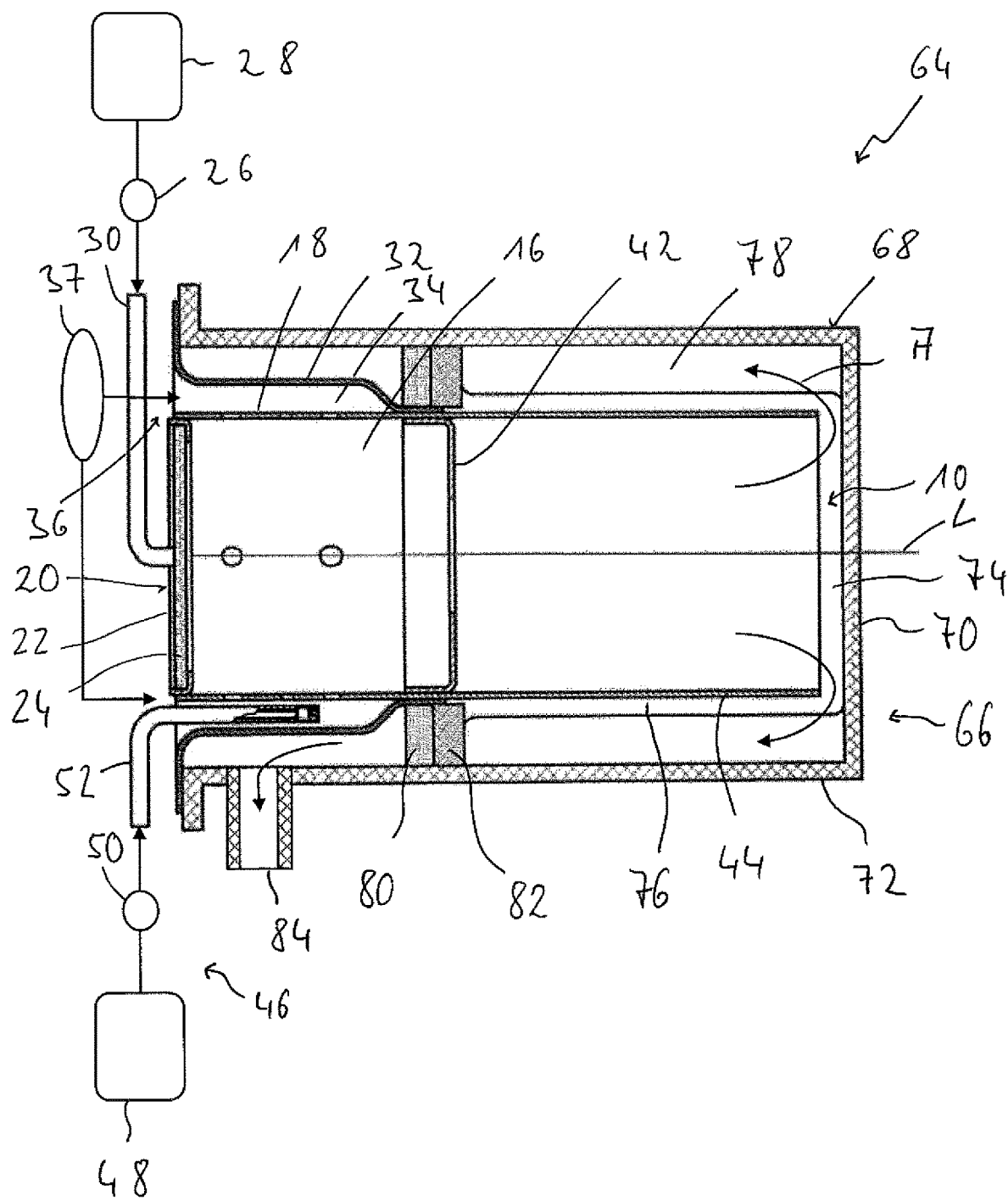
FIG. 9 is a vehicle heater with a combustion chamber assembly unit as shown in FIG. 1.

FIG. 9 shows a fuel-operated vehicle heater 64, in which a combustion chamber assembly unit 12 as is shown, for example, in FIG. 1, is used. It should be noted that the combustion chamber assembly unit shown in FIG. 5 could, of course, also be used in the vehicle heater 64 shown in FIG. 9.

The vehicle heater 64 comprises a heat exchanger unit generally designated by 66 with a heat exchanger housing 68 surrounding the combustion chamber assembly unit 10. The heat exchanger housing 68 has a bottom wall 70 located opposite the axially open end of the flame tube 44 as well as a circumferential wall 72 surrounding the combustion chamber assembly unit 10 on the radial outer side thereof. The circumferential wall 72 may be fixed, for example, together with the outer circumferential wall 32 of the combustion chamber assembly unit 10, which said wall surrounds the combustion chamber housing 14, at a carrier, and it may be connected to the combustion air blower 37.

A waste gas flow volume, generally designated by 74, is formed between the outer side of the combustion chamber assembly unit 10, especially of the flame tube 44, and the outer circumferential wall 32 and the heat exchanger housing 68. The waste gas A leaving the flame tube 44 at the open end thereof, which end is located axially opposite the bottom wall 70, is deflected radially outwards at the bottom wall 70 and it reaches a waste gas flow space 76, which is formed between the circumferential wall 72 and the flame tube 44 or the outer circumferential wall 32, and which provides a part of the entire waste gas flow volume 70. The waste gas A flows in the waste gas flow space 76 essentially in the direction of the housing longitudinal axis L away from the bottom wall 70 and it flows around heat transfer ribs 78 provided on the inner side of the heat exchanger housing 68 in the process. The waste gas A now transfers heat to the heat exchanger housing 68, which can transfer this heat or the majority of this heat to the medium to be heated, which flows around the heat exchanger housing 68 on the outer side thereof.

At first an SCR catalytic converter device 82 and then an oxidation catalytic converter device 80 are provided following one another or in the flow direction in the waste gas flow space 76, for example, adjoining the heat transfer ribs 78 axially. The waste gas A flows around the two catalytic converter devices 82, 80 or flows through these one after another and then reaches a waste gas outlet 84 over a then following part of the waste gas flow space 76.

In the embodiment of the vehicle heater 64 shown in FIG. 9, the cooling medium feed device 46 is configured to introduce a reducing agent, i.e., for example, a urea/water solution, from the cooling medium reservoir 48 into the combustion air feed chamber 34 or generally into the combustion air feed volume 36 via the cooling medium feed line 52. Based on the high temperature in the area of the combustion air feed chamber 34, the urea/water solution evaporates very rapidly and is absorbed by the combustion air and is transported into the combustion chamber 16. The value of the percentage of liquid cooling medium evaporating already in the combustion air feed chamber 34 can be adapted especially by varying the depth of immersion of the cooling medium feed line 52 into the combustion air feed chamber 34.

As was already described above, the combustion temperature of the combustion taking place in the combustion chamber 16 is lowered by the evaporation of the liquid cooling medium and the transportation of the evaporated or liquid cooling medium in the combustion air, accompanied by a percentage of nitrogen oxides in the waste gas that is already lowered thereby. Based on the very high temperature, to which the urea/water solution being transported in the combustion air is exposed, thermolysis of the urea into ammonia and isocyanuric acid will take place. The isocyanuric acid is then converted into ammonia by hydrolysis. A hydrolysis catalytic converter usually necessary for this in vehicles is not therefore necessary in the case of the vehicle heater 64 configured according to the present invention.

While the CO (carbon monoxide) content and the HC (hydrocarbon) content in the waste gas can be reduced to the detection limit in the oxidation catalytic converter device 80, nitrogen monoxide and nitrogen dioxide are reacted by the catalytic reduction taking place in the SCR (Selective Catalytic Reduction) catalytic converter device 82 with the ammonia being transported in the waste gas to form nitrogen and water. The waste gas stream leaving the vehicle heater 64 therefore has a further lowered percentage of nitrogen oxides.

It should finally be noted that in the configuration shown in FIG. 9, the SCR catalytic converter device 82 and the oxidation catalytic converter device 80 may be structurally combined with one another by applying the surface coatings to be provided for the different catalytic reactions to one and the same substrate, preferably in the sequence shown in FIG. 9 in the flow direction, so that the flow takes place again first around or through the SCR catalytic converter device 82 and then around or through the oxidation catalytic converter device 80.

While specific embodiments of the invention have been shown and described in detail to illustrate the application of the principles of the invention, it will be understood that the invention may be embodied otherwise without departing from such principles.

What is claimed is:

1. A combustion chamber assembly unit for a fuel-operated vehicle heater, the combustion chamber assembly unit comprising:
    a combustion chamber housing elongated in a direction of a housing longitudinal axis, the combustion chamber housing comprising a combustion chamber circumferential wall delimiting a combustion in a radial direction and a combustion chamber bottom axially delimiting the combustion chamber;
    a combustion air feed volume open to the combustion chamber via a plurality of passage openings in the combustion chamber housing; and
    a cooling medium feed device for feeding a liquid cooling medium to the combustion air feed volume.

2. A combustion chamber assembly unit in accordance with claim 1, further comprising an outer circumferential wall surrounding the combustion chamber circumferential wall on an outside, wherein:
    the combustion chamber circumferential wall cooperates with the combustion chamber circumferential wall to form a combustion air feed chamber of the combustion air feed, between the combustion chamber circumferential wall and the outer circumferential wall; and
    the combustion air feed chamber is open to the combustion chamber over at least some of the passage openings; and
    the cooling medium feed device comprises at least one cooling medium feed line for releasing liquid cooling medium into the combustion air feed chamber.

3. A combustion chamber assembly unit in accordance with claim 2, wherein the at least one cooling medium feed line opens into the combustion air feed chamber.

4. A combustion chamber assembly unit in accordance with claim 2, wherein the cooling medium feed line has at least one cooling medium release opening, which is open to the combustion air feed chamber.

5. A combustion chamber assembly unit in accordance with claim 4, wherein the cooling medium feed device further comprises a cooling medium release nozzle with the at least one cooling medium release opening at one end of a line section of the cooling medium feed line, which line section extends into the combustion air feed chamber.

6. A combustion chamber assembly unit in accordance with claim 5, wherein the line section extends essentially in a direction of the housing longitudinal axis.

7. A combustion chamber assembly unit in accordance with claim 4, wherein:
    the combustion air feed chamber surrounds the combustion chamber radially outside, in at least some areas; and
    the cooling medium feed line comprises a line section extending in the combustion air feed chamber around the combustion chamber circumferential wall in a circumferential direction in at least some areas;
    the at least one cooling medium release opening is provided in the line section.

8. A combustion chamber assembly unit in accordance with claim 7, wherein:
    the at least one cooling medium release opening comprises a plurality of cooling medium release openings; and
    the plurality of cooling medium release openings are arranged along the line section, following one another in the circumferential direction.

9. A combustion chamber assembly unit in accordance with claim 7, wherein:
the at least one cooling medium release opening is provided on a side of the line section that axially faces the combustion chamber bottom; or
the at least one cooling medium release opening is provided on a side of the line section that faces axially away from the combustion chamber bottom.

10. A combustion chamber assembly unit in accordance with claim 1, wherein the cooling medium feed device further comprises a cooling medium pump and a cooling medium reservoir, the cooling medium pump delivering the liquid cooling medium from the cooling medium reservoir to the combustion air feed volume.

11. A combustion chamber assembly unit in accordance with claim 1, wherein the combustion chamber bottom comprises porous evaporator medium and a fuel feed line guiding liquid fuel to the porous evaporator medium.

12. A vehicle heater comprising a combustion chamber assembly unit, the combustion chamber assembly unit comprising:
a combustion chamber housing elongated in a direction of a housing longitudinal axis, the combustion chamber housing comprising a combustion chamber circumferential wall delimiting a combustion in a radial direction and a combustion chamber bottom axially delimiting the combustion chamber;
a combustion air feed volume open to the combustion chamber via a plurality of passage openings in the combustion chamber housing; and
a cooling medium feed device for feeding a liquid cooling medium to the combustion air feed volume.

13. A vehicle heater in accordance with claim 12, further comprising:
at least one waste gas flow volume; and
a reduction catalytic converter device provided in the waste gas flow volume, wherein the cooling medium feed device is configured to feed a reducing agent as the liquid cooling medium.

14. A vehicle heater in accordance with claim 13, further comprising a heat exchanger housing, wherein:
the at least one a waste gas flow space, providing the at least a part of the gas flow volume is formed between the combustion chamber assembly unit and a heat exchanger housing; and
the reduction catalytic converter device is arranged in the waste gas flow space.

15. A vehicle heater in accordance with claim 13, wherein further comprising an oxidation catalytic converter device provided in the waste gas flow volume.

16. A vehicle heater in accordance with claim 15, wherein the reduction catalytic converter device is integrated into the oxidation catalytic converter device.

17. A vehicle heater in accordance with claim 14, wherein the combustion chamber assembly unit further comprising an outer circumferential wall surrounding the combustion chamber circumferential wall on an outside, wherein:
the combustion chamber circumferential wall cooperates with the combustion chamber circumferential wall to form a combustion air feed chamber of the combustion air feed, between the combustion chamber circumferential wall and the outer circumferential wall; and
the combustion air feed chamber is open to the combustion chamber over at least some of the passage openings; and
the cooling medium feed device comprises at least one cooling medium feed line for releasing liquid cooling medium into the combustion air feed chamber.

18. A vehicle heater in accordance with claim 17, wherein the cooling medium feed device further comprises a cooling medium release nozzle with the at least one cooling medium release opening at one end of a line section of the cooling medium feed line, which line section extends into the combustion air feed chamber and is open to the combustion air feed chamber.

19. A vehicle heater in accordance with claim 17, wherein:
the cooling medium feed line has at least one cooling medium release opening, which is open to the combustion air feed chamber
the combustion air feed chamber surrounds the combustion chamber radially outside, in at least some areas;
the cooling medium feed line comprises a line section extending in the combustion air feed chamber around the combustion chamber circumferential wall in a circumferential direction in at least some areas; and
the at least one cooling medium release opening is provided in the line section.

20. A vehicle heater in accordance with claim 17, wherein the cooling medium feed device further comprises a cooling medium pump and a cooling medium reservoir, the cooling medium pump delivering the liquid cooling medium from the cooling medium reservoir to the combustion air feed volume.

* * * * *